July 17, 1923.

E. A. KUEN

CLOSURE CONSTRUCTION FOR AUTO LAMPS

Filed Oct. 8, 1921  2 Sheets-Sheet 1

1,461,799

INVENTOR
Eugene A. Kuen
Thornton Bogert
ATTORNEY

July 17, 1923.
E. A. KUEN
CLOSURE CONSTRUCTION FOR AUTO LAMPS
Filed Oct. 8, 1921  2 Sheets-Sheet 2
1,461,799
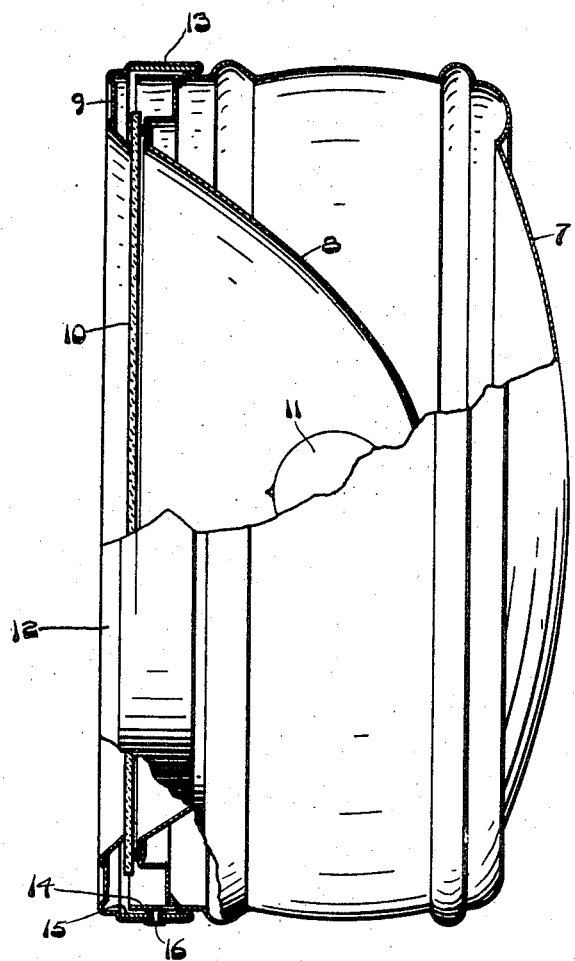
FIG. 2
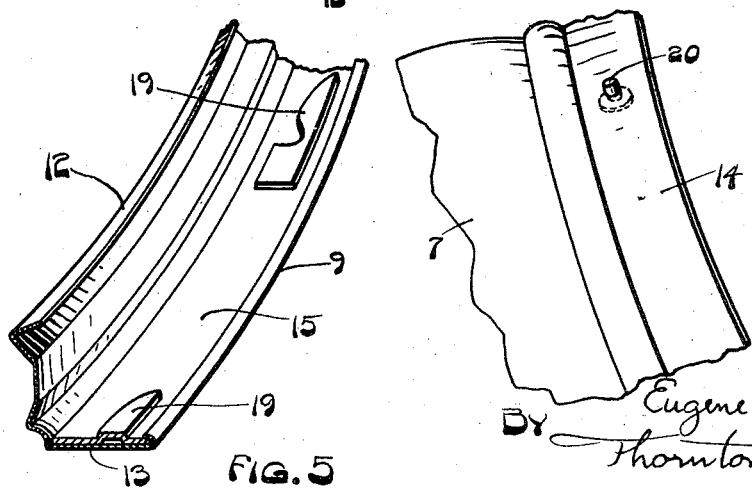
FIG. 6
FIG. 5
INVENTOR
Eugene A. Kuen
BY Thornton Bogert
ATTORNEY Patented July 17, 1923.

1,461,799

UNITED STATES PATENT OFFICE.

EUGENE A. KUEN, OF CINCINNATI, OHIO, ASSIGNOR TO THE THOS. J. CORCORAN LAMP CO., OF CINCINNATI, OHIO, A CORPORATION OF OHIO.

CLOSURE CONSTRUCTION FOR AUTO LAMPS.

Application filed October 8, 1921. Serial No. 506,420.

*To all whom it may concern:*

Be it known that I, EUGENE A. KUEN, a citizen of the United States, residing at Cincinnati, in the county of Hamilton and State of Ohio, have invented a new and useful Closure Construction for Auto Lamps, of which the following is a specification.

This invention relates particularly to an improved door or closure rim construction for auto lamps and has for an object to produce an auto lamp closure which may be made of much lighter gage material than has been possible heretofore, without sacrificing the strength of the finished closure.

A further object is to produce an improved construction which will permit of the closure rim being made of a more expensive material better adapted to the usual plating operations, without increasing the cost of the rim production.

A further object is to produce a closure rim which, by an improved manner of reenforcement, combines therein a simple and efficient means of disposing of the water of condensation which usually collects within the lamp in the course of using it.

These and other objects are attained in the improved construction described in the following specification and illustrated in the accompanying drawings, in which:

Fig. 2 is a side elevation of the lamp shown in Fig. 1, a portion of the lamp being broken away and shown in section to disclose to better advantage the closure rim construction embodying my invention.

Fig. 5 is an interior fragmental perspective view of a closure rim embodying my invention, but showing certain modified features for facilitating its fastening to a lamp body.

Fig. 6 is an external fragmental perspective view of a portion of a lamp body arranged for cooperation with the closure rim shown in Fig. 5.

Figure 1:
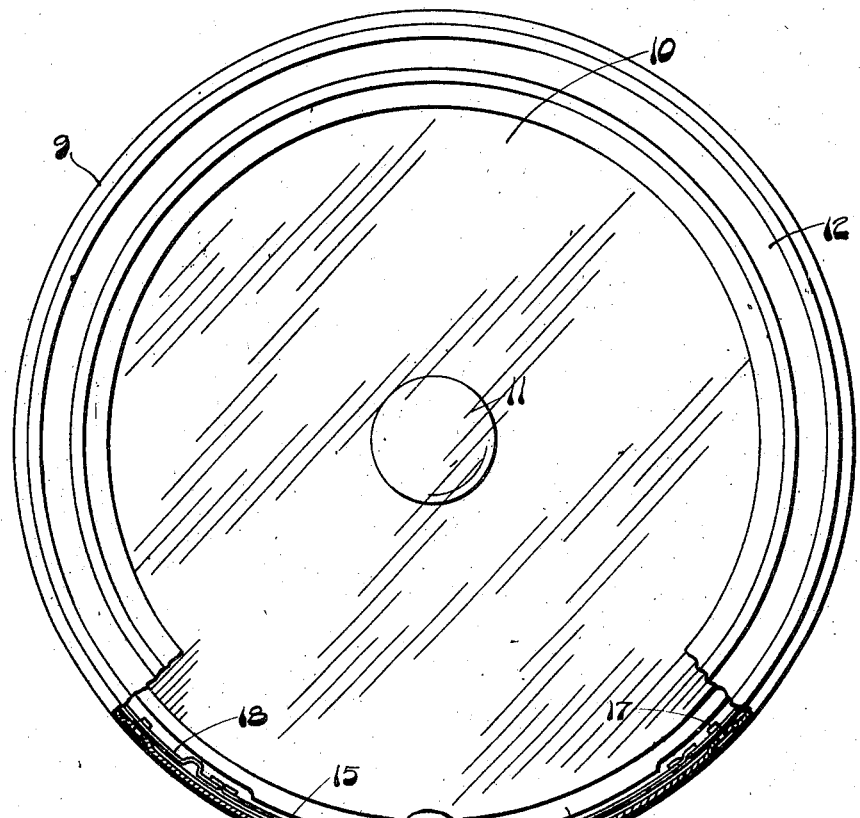
Fig. 1 is a front elevation of an auto lamp, a portion of the closure rim being broken away and shown in section for convenience of illustration.

In the drawings I have shown the conventional type of auto lamp having a body 7 within which a reflector 8 is mounted in any suitable manner and closed by a closure consisting of a rim 9 and a lens 10, with the usual electric bulb 11 located within the reflector.

Figures 3, 4:
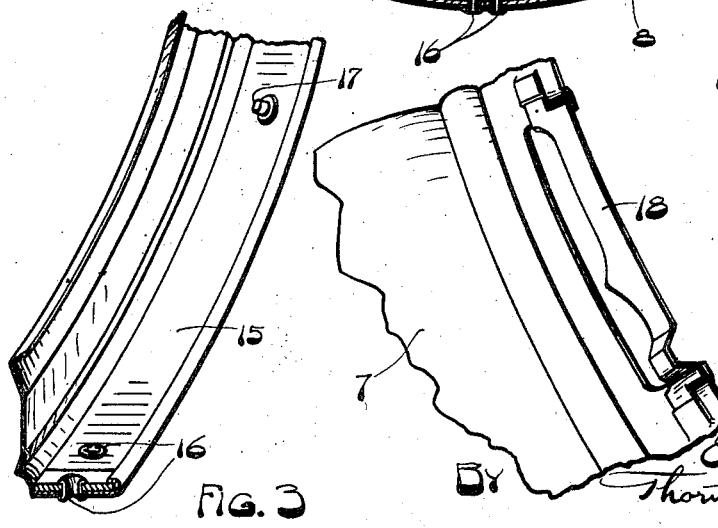
Fig. 3 is an interior fragmental perspective view showing also in section my improved closure rim construction.
Fig. 4 is an external fragmental perspective view of a portion of a lamp body arranged for cooperation with the closure rim shown in Fig. 3.

The closure rim is the element embodying the features of novelty herein described. This rim may have the usual ornamental front portion 12 surrounding the closure glass 10, the annular rearwardly extending wall 13 of the rim taking over the annular forwardly extending wall 14 of the body. Within the wall 13 an internally located lining or reenforcing ring 15 is located. This ring may be made of a strip of relatively rigid material formed into ring shape with its ends abutting as shown in Figs. 1 and 3, although it may as readily be made endless. At each end or at any point the ring may be secured to the wall 13 of the closure rim by an eyelet 16 as shown, the extreme rear edge of the wall 13 then being turned inwardly and forwardly over the rear edge of the ring 15 to make of it an inseparable part of the closure rim. Thus the eyelets or rivets perform the function of positively retaining the ring against displacement previous to the edge turning operation upon wall 13, at the same time serving as passages to permit the water of condensation from the lamp to drip through them.

In Figs. 1, 3 and 4 I have shown a form of fastening device by means of which the closure is held in closed relation to the body. This fastening device consisting in providing in the ring 15 a series of rivets 17 which have their shanks extending inwardly, these rivets cooperating with a series of springs 18 mounted in the wall 14 of the body. In Figs. 5 and 6 another form of closure fastening is illustrated, which, being well known in the art, needs no further elucidation herein, it being merely my intention to show how my improved construction can be readily adapted to existing and well known types of lamp closure fastenings. In the form shown in Figs. 5 and 6 the bayonet lugs 19 are preferably embossed from ring 15 as shown, the cooperating rivets 20 of the body being secured within the body wall 14 as shown.

In my improved construction there are several things attained which have not been possible in other constructions known to me. By making the ring of relatively heavy material the closure rim may be made of relatively light material, in fact of much thinner material than it has been feasible to provide heretofore. This results in a very materially strengthened closure rim construction, which is in fact much stronger than it would be practicable to make were the usual thickness of rim material provided. In addition to this advantage is that to be found in being able to produce a closure rim of a material, such as brass, much better adapted to plating operations than the usual stiffer but cheaper material such as steel, without having to increase the cost over the usual steel rim. This is because of the construction permitting of thin instead of thick material being used, thus rendering the cost in no way increased, but under certain conditions decreased. Among further advantages may be mentioned the double function performed by the eyelet rivets, which, while holding the ring in position until the edge of the closure wall is spun over it, also acts to allow the water of condensation to escape from the lamp without having to provide the usual raw edged perforations or drilled holes in the bottom of the door or closure rim.

Having thus described my invention what I claim is:

1. A closure construction for auto lamps, comprising a closure rim having an annular rearwardly extending wall, a metal strip located within the wall in annular formation and means adapted to secure the ends of the strip to the wall and to permit discharge of moisture therethrough.

2. A closure construction for auto lamps, comprising a closure rim having an annular rearwardly extending wall, a ring located within the wall, and an eyelet securing the ring to the wall, said wall having its rear edge turned inwardly over the ring.

3. In an automobile lamp the combination of a body having a forwardly extending annular wall, a closure rim for cooperation with the body having a rearwardly extending annular wall, a ring within the wall of the rim, an eyelet securing the ring to the wall, said ring being adapted to pass over the annular wall of the body in placing the closure rim in cooperative relation to the body.

4. In an automobile lamp the combination of a body having a forwardly extending annular wall, a closure rim having a rearwardly extending annular wall, a metal strip located within the wall in annular formation, and eyelets adapted to secure the ends of the strip to the wall, said ring being adapted to pass over the annular wall of the body when the rim is placed in cooperative relation therewith.

EUGENE A. KUEN.